(12) United States Patent
Bar-Joseph (10) Patent No.: US 9,954,341 B2
(45) Date of Patent: Apr. 24, 2018

(54) 2097NM LASER RESONATOR AND METHOD

(71) Applicant: Marysol Technologies, Clearwater, FL (US)

(72) Inventor: Dan Bar-Joseph, Clearwater, FL (US)

( * ) Notice: Subject to any disclaimer, the term of this patent is extended or adjusted under 35 U.S.C. 154(b) by 0 days.

(21) Appl. No.: 15/185,867

(22) Filed: Jun. 17, 2016

(65) Prior Publication Data

US 2017/0125967 A1    May 4, 2017

Related U.S. Application Data

(60) Provisional application No. 62/248,863, filed on Nov. 2, 2015.

(51) Int. Cl.
| | | |
|---|---|---|
| H01S 3/139 | (2006.01) |
| H01S 3/08 | (2006.01) |
| H01S 3/16 | (2006.01) |
| H01S 3/06 | (2006.01) |
| H01S 3/092 | (2006.01) |
| H01S 3/042 | (2006.01) |
| H01S 3/04 | (2006.01) |
| H01S 3/105 | (2006.01) |

(52) U.S. Cl.
CPC .......... *H01S 3/08059* (2013.01); *H01S 3/042* (2013.01); *H01S 3/0407* (2013.01); *H01S 3/061* (2013.01); *H01S 3/092* (2013.01); *H01S 3/105* (2013.01); *H01S 3/139* (2013.01); *H01S 3/161* (2013.01); *H01S 3/1616* (2013.01); *H01S 3/1623* (2013.01); *H01S 3/1643* (2013.01)

(58) Field of Classification Search
CPC .......... H01S 3/092; H01S 3/139; H01S 3/161; H01S 3/1616; H01S 3/1623
See application file for complete search history.

(56) References Cited

U.S. PATENT DOCUMENTS

| | | | | |
|---|---|---|---|---|
| 5,563,899 A | * | 10/1996 | Meissner | ................ B32B 17/00 372/35 |
| 2010/0272130 A1 | * | 10/2010 | Mu | .......... H01S 3/093 372/10 |
| 2016/0294148 A1 | * | 10/2016 | Epshtein | ................ H01S 3/093 |

* cited by examiner

*Primary Examiner* — Tod T Van Roy
(74) *Attorney, Agent, or Firm* — Justin Luby (57) ABSTRACT

A flash lamp pumped CTH:YAG resonating laser and method for operating the laser whereby the laser is capable of lasing at the 2097 nm wavelength. The method for operating at the 2097 nm wavelength include utilizing an output coupler with a lower reflectivity and minimizing the passive losses in the laser. The resulting laser is capable of operating with a lower intra-cavity energy density and increased output energy, decreasing the probability of optical breakdown of the laser components when operated.

1 Claim, 7 Drawing Sheets

2097NM LASER RESONATOR AND METHOD

CROSS-REFERENCE TO RELATED APPLICATIONS

This application claims priority to provisional application U.S. Ser. No. 62/249,863 filed Nov. 11, 2015. Said application is incorporated by reference herein in its entirety.

BACKGROUND

This invention relates to device and method of generating high energy, high efficiency 2097 nm laser output in a CTH:YAG flash lamp pumped resonator at room temperature with low intra-cavity energy density. The design reduces the possibility of optical damage to the components and/or operation at more than double of the output comparable to existing technology.

Flash lamp pumped CTH:YAG lasers (Yttrium aluminum garnet crystal co-doped with Chromium, Thulium and Holmium ions) are used in many medical applications. The laser beam is usually delivered through a 200-1000 micron fused silica fiber. However, the CTH:YAG laser material has design problems. It exhibits low gain and high thermal lensing making it difficult to achieve high energy/high power output.

With existing technology flash lamp pumped CTH:YAG lasers operate the 2130 nm transition and a maximum output energy of approx. 4 Joules/pulse is achieved at typical output power of approx. 40 watt.

Due to higher gain and lower absorption losses of the 2130 nm transition in flash lamp pumped CTH:YAG, at room temperature, the laser will naturally operate at 2130 nm.

Historically, the aim when designing a typical CTH:YAG laser, the focus of the designer was to optimize the efficiency of the laser. In order to achieve efficient high energy/high output power the laser are operated at 2130 nm. When operating an energy efficient 2130 nm CTH:YAG laser the intra-cavity energy density will be 7-10 times higher than the output energy. Due to the high intra-cavity energy density required to operate at this level the optical breakdown is accelerated creating a problem where the typical CTH:YAG laser system requires frequent costly repairs and maintenance. Since the CTH:YAG laser is used mainly in medical applications reliability and low maintenance cost are very important.

SUMMARY

The aim of this this invention is to develop a CTH:YAG laser resonator module and lasing method which facilitates operation at below 2130 nm or any other transition with an absorption coefficient higher than 0.1 such as 2097 nm.

Another aim of the invention is to develop a lasing method which it makes it possible to lase while totally suppressing the 2130 nm transition using a low reflectivity output coupler. In this way the power density inside the resonator is drastically reduced to safe levels avoiding optical breakdown.

Yet another aim of the invention is to develop a lasing method which it makes it possible to generate safely, output energies up to 10 Joules or more per pulse.

DETAILED DESCRIPTION OF THE INVENTION AND PREFERRED EMBODIMENT

Figure 1:
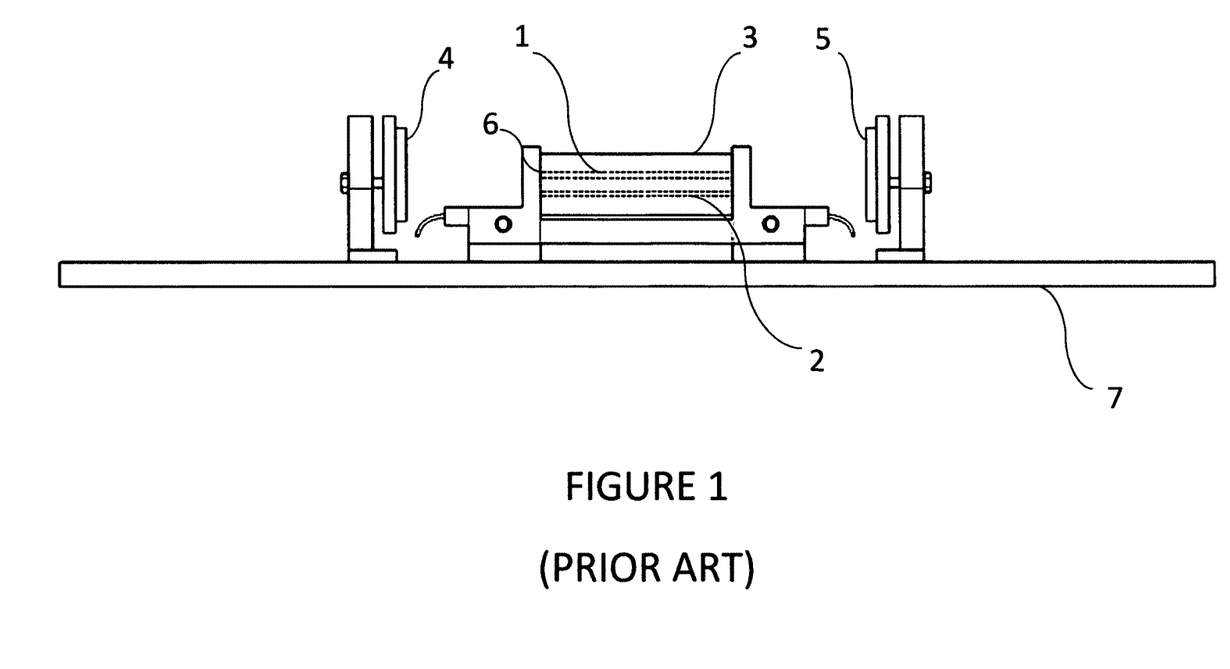
FIG. 1 is a plan view of a CTH:YAG laser resonator module.
Figure 2:
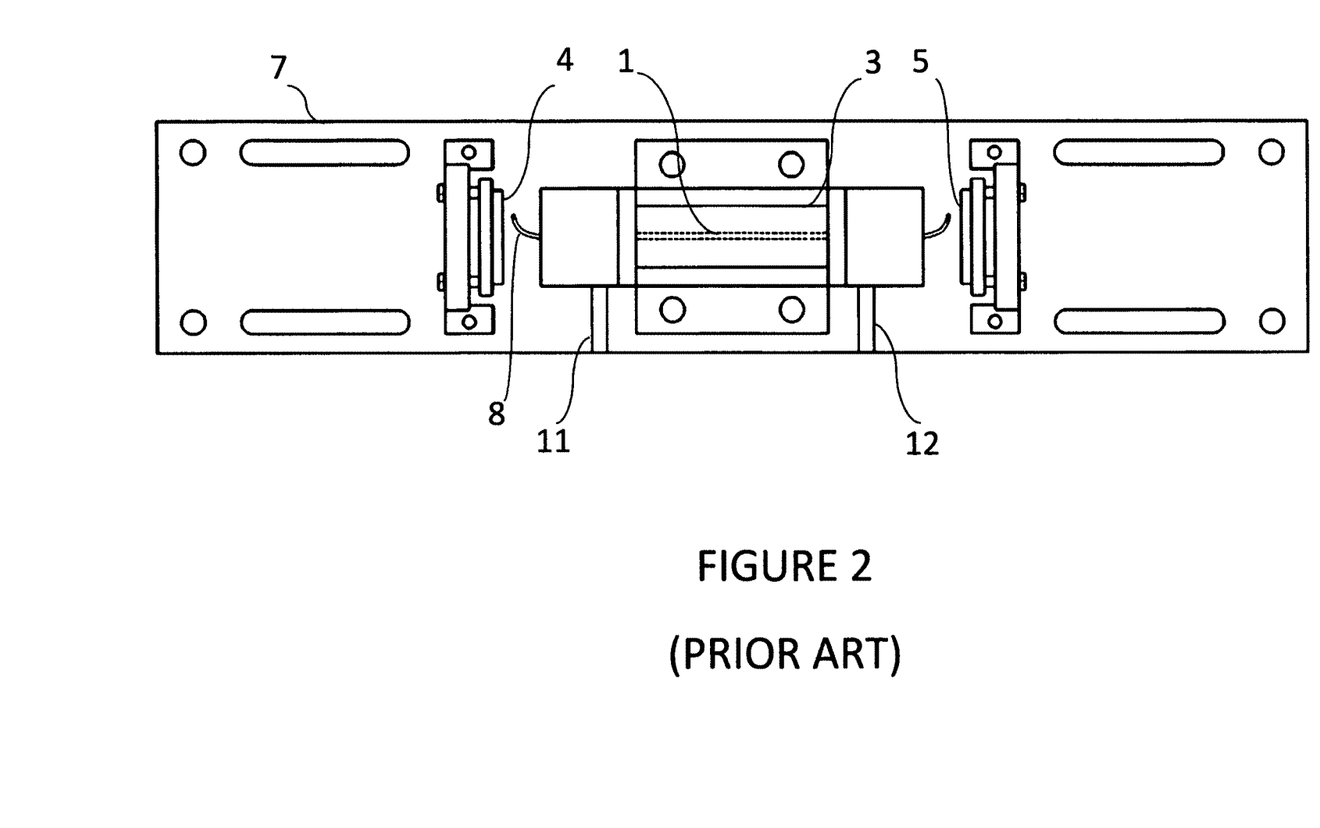
FIG. 2 is a side view of a CTH:YAG laser resonator module.
Figure 3:
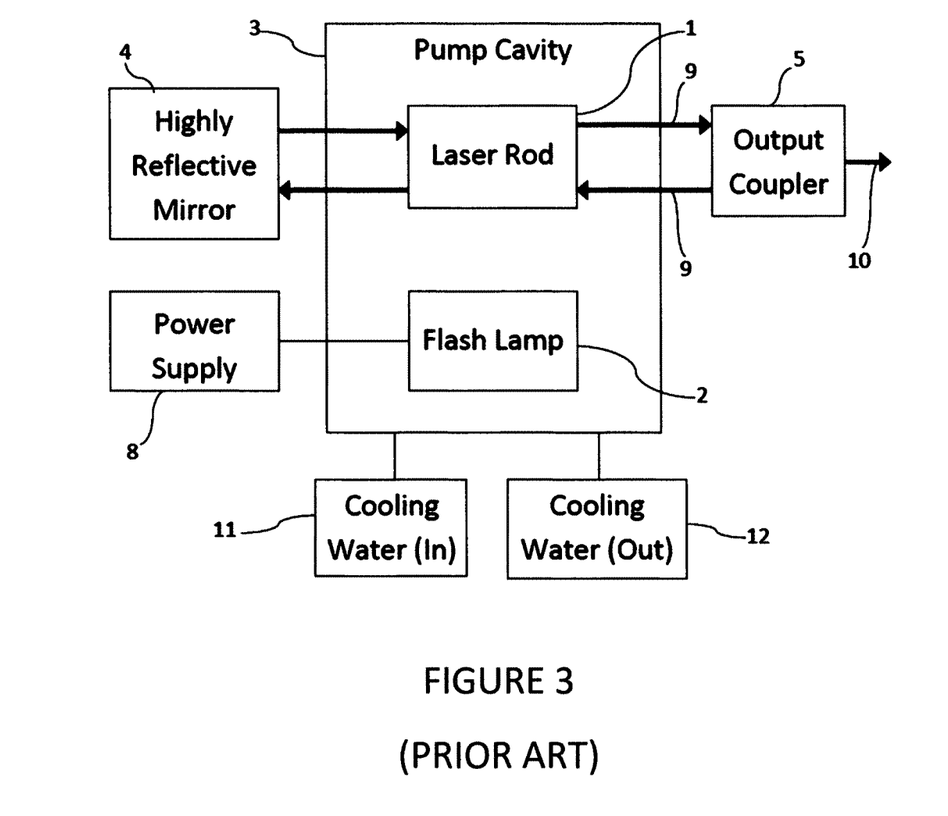
FIG. 3 is a process flow block diagram of a CTH:YAG laser resonator module.

Referring to FIGS. 1, 2 & 3, a CTH:YAG laser resonator module is comprised of the following core components: laser rod 1, flash lamp 2, pump cavity 3, high reflector mirror 4, and output coupler 5.

The laser rod 1 is a medium which can amplify and direct power of light into the form of a laser beam. The laser rod 1 operates by light being pumped into the rod through the outer surface area of the rod 1 which then amplifies and directs the photons through the two tips of the laser rod in the form of a laser beam. The laser rod 1 is constructed of CTH:YAG (Yttrium aluminum garnet crystal co-doped with Chromium, Thulium and Holmium ions). In the preferred embodiment of the invention, the doping concentration of the laser rod 1 is 0.85% Cr, 5.9% Tm, 0.36% Ho, the diameter of the laser rod 1 is between 3 mm to 7 mm, and the length of the laser rod is between 70 mm to 150 mm, however, other configurations of the laser rod 1 could be utilized. The tip configuration for the laser rod 1 can be either flat/flat or concave/concave.

The flash lamp 2 is used to optically pump light into the laser rod 1 to achieve a population inversion in the laser rod 1 and thus to obtain optical amplification via stimulated emission. In the preferred embodiment of the invention a Xenon 200-900 Torr flash lamp 2 is used to optically pump light into the laser rod 1.

The flash lamp is controlled by an oscillating power supply 8 that activates/deactivates the lamp 2 in a rapid, pulsating manner. The power supply for the flash lamp 2 can be generated by either a Pulse Forming Network (PFN) or an Insulated-Gate Bipolar Transistor (IGBT). The power supply 8 should match the impedance of the lamp 2 operating the lamp 2 at full lamp simmer, and be capable of delivering adequate output energy and power.

The pump cavity 3 houses both the outer surface area of the laser rod 1 and the light emitting surface of the flash lamp 2. In the preferred embodiment the pumping cavity 3 is a diffused reflector type pump cavity 3 formed of compressed Barium Sulfate or a solid ceramic material that that is characterized by having 98% or more diffuse reflectivity in the absorption bands of the Chromium and Thulium to fully illuminate the exterior surface of the laser rod 1 with the light emitted from the flash lamp 2.

While the preferred embodiment of the invention utilizes a diffused reflector type pump cavity, a specular reflector pump cavity (not depicted), which is known to those skilled in the art, could be utilized interchangeably. However, due to the compact design of the diffused reflector type pump cavity 3, it is preferred.

Additionally, through the diffused reflector pump cavity 3, coolant water 11, 12 will be circulated. The function of the cooling water 11, 12 is to remove waste heat from the components, thereby preventing stress induced failure and increasing lifespan of the components.

In flash lamp pumped laser pump cavities 3 which are mainly water cooled the ends 6 of the laser rod 1 are not exposed to the flash lamp 2 light (pumping light). In CTH:YAG which has absorption at laser wavelength this approach will generate passive losses reducing the efficiency of the laser. The laser rod 1 is generally sealed by means of silicon O-rings and some space is necessary for the insertion of the cooling water. The un-pumped length of the rod 6 can vary between millimeters to centimeters. To improve efficiency, in the preferred embodiment of the invention passive losses in the un-pumped area 6 of the rod can be minimized by attaching metal connectors to the rod or using bonded rods in which a stub of undoped YAG is fused to the doped core material. This arrangement is preferable because it provides a safer seal and maximizes the exposed area, therefore improving the laser efficiency.

A highly reflective 4 mirror is a dielectric mirror used in a laser resonator. Its function is to reflect all of the circulating intra-cavity optical power 9 back to the laser rod 1 to sustain power level of the beam.

An output coupler 5 is a semi-transparent dielectric mirror used in a laser resonator. Its function is to reflect a portion of the circulating intra-cavity optical power back to the laser rod 1 to sustain power level of the beam and to transmit part of the circulating intra-cavity optical power in order to generate a useful output of the laser.

The diffusive pump cavity 3, highly reflective mirror 4 and output coupler 5 are all mounted on a structure 7 which maintains alignment of the 3 components. While not required, in the preferred embodiment of the invention the structure is provided with adjustment capability to allow for variation in the distance of the mirrors 4, 5 from the pump cavity 3. The structure 7 will allow some adjustment of the distance of the mirrors 4, 5 from each other while keeping the pump cavity 3 centered between the mirrors 4,5.

When operating, the resonating laser will reflect the laser beam 9 between the highly reflective mirror 4 and the output coupler 5, increasing the power of the beam 9 each time it passes through the laser rod 1, where optical amplification occurs by pumping light from the flash lamp 2 into the laser rod 1. While the beam 9 is resonating between the highly reflective mirror 4 and the output coupler 5 a portion of the beam is transmitted from the output coupler 5 as the useful output of the laser 10.

The above described CTH:YAG laser resonator module design is widely used and known to those skilled in the skilled in the art.

For flash lamp pumped CTH:YAG lasers there are two main laser transitions: approx. 2130 nm and approx. 2097 nm.

Historically, when designing a typical CTH:YAG laser, the focus of the designer was to optimize the efficiency of the laser. In order to achieve efficient high energy/high output power the lasers are operated at 2130 nm. At 2130 nm it is necessary to use output coupler mirrors 5 with high reflectivity, typically between 75-85% R. The intra-cavity energy density will be then many times higher than the output energy density by a factor of $(1+R)/(1-R)$ where R is the reflectivity of the output coupler. At 75-80% R the intra-cavity energy density will be 7-10 times higher than the output energy. Usually, 4 mm diameter rods are used and at 4 Joules output, the intra-cavity energy density can reach more than 400 Joules/cm. Because of the radial modulation of the laser beam which has usually a Gaussian profile, a "hot spot" factor of at least 1.5 is used to calculate the intra-cavity energy density which in this case it is very close to the damage threshold of the optical coatings of the mirrors 4, 5 and the laser rod 1 and approx. 4 Joules/pulse appears to be the maximum output energy achievable.

The current invention consists of a flash lamp pumped CTH:YAG lasers design which facilitates operation at 2097 nm. If certain conditions are met as further described, it is possible to lase at 2097 nm totally suppressing the 2130 nm transition.

By inducing laser operation at 2097 nm or less, the intra-cavity energy density is minimized preventing damage of the optical coatings of the mirrors 4, 5 and the laser rod 1. The typical 80% output coupler 5 used in this application has been replaced by a low reflectivity output coupler 5 (45-65% R). In this way the intra-cavity energy density is drastically reduced to safe levels avoiding optical breakdown. Also it makes it possible to generate safely, output energies up to 10 Joules or more per pulse, levels which are not achievable at the 2130 nm transition.

While achieving a lower intra-cavity energy density and increased output energy, lasing at less than the 2130 nm transition will slightly decrease the efficiency of the laser because of the increased laser threshold. The 2130 nm has a higher emission effective cross section of approx. $6 \times 10^{-21}$ cm$^2$ compared to approx. $4 \times 10^{-21}$ cm$^2$ for the 2097 nm transition. The slight increase of the laser threshold may not make the laser of this invention ideal for all applications such as high repetition rates, low output energy, however, the resulting reduction in equipment breakdowns and increased potential output energies will be beneficial in many applications.

At room temperature, the absorption coefficient at the lasing wavelength of the material is approx. 0.05/cm at 2130 m and 0.15/cm at 2097 nm. The 2097 nm ground state absorption is comparable to the absorption of ruby (0.2/cm) so this transition can be regarded as a classic three-level laser. The 2130 nm transition, at lower ground state absorption is defined in literature as a quasi-three-level laser transition but can be also modeled using the three-level laser equations.

Figure 4:
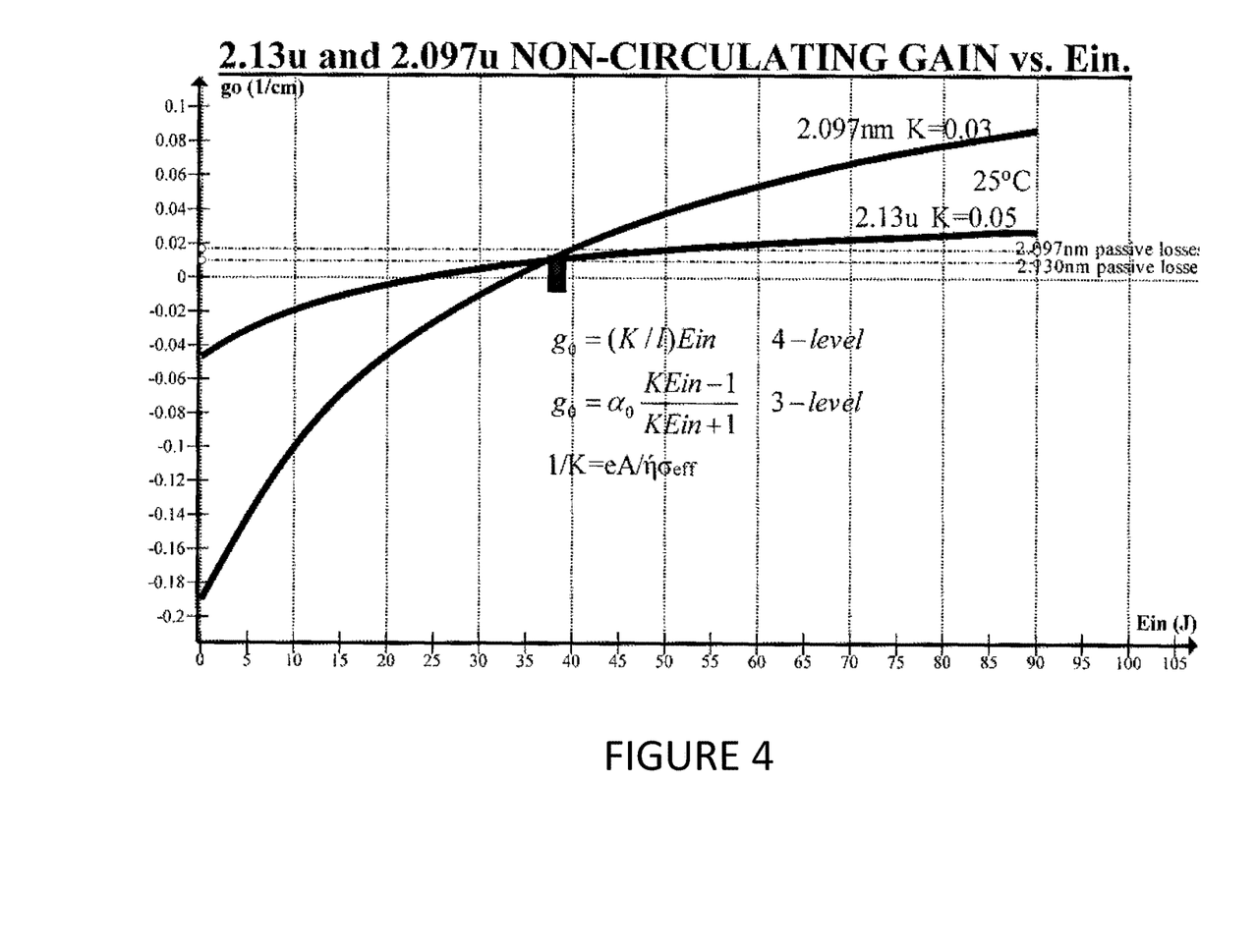
FIG. 4 is a graph showing the relation between the non-circulating gain for 2130 and 2097 nm ($g_o$) plotted against the input energy (Ein).

FIG. 4 is a graphical representation of a plot showing the non-circulating gain for 2130 and 2097 nm ($g_o$) plotted against the input energy (Ein), having the form of EQN 1 whereby $\alpha_o$ is the absorption coefficient (@2130 nm=0.05/cm, @2097 nm=0.15/cm), K is the amplification coefficient (@2130 nm=0.057, @2097 nm=0.037).

$$g = \alpha_0 \frac{KEin - 1}{KEin + 1} \quad \text{EQN 1}$$

Referring to FIG. 4, it can be seen that at certain input, the non-circulating gain at 2097 exceeds the 2130 nm gain but in order to lase efficiently at 2097 nm, passive losses (L) must be reduced or eliminated. This is achieved by use of bonded (clear ends) laser rods or metal connectors attached to the rod by means of a compressed o-ring, RTV, etc. Residual losses 1-3% are typically found in any laser resonator.

Figure 5:
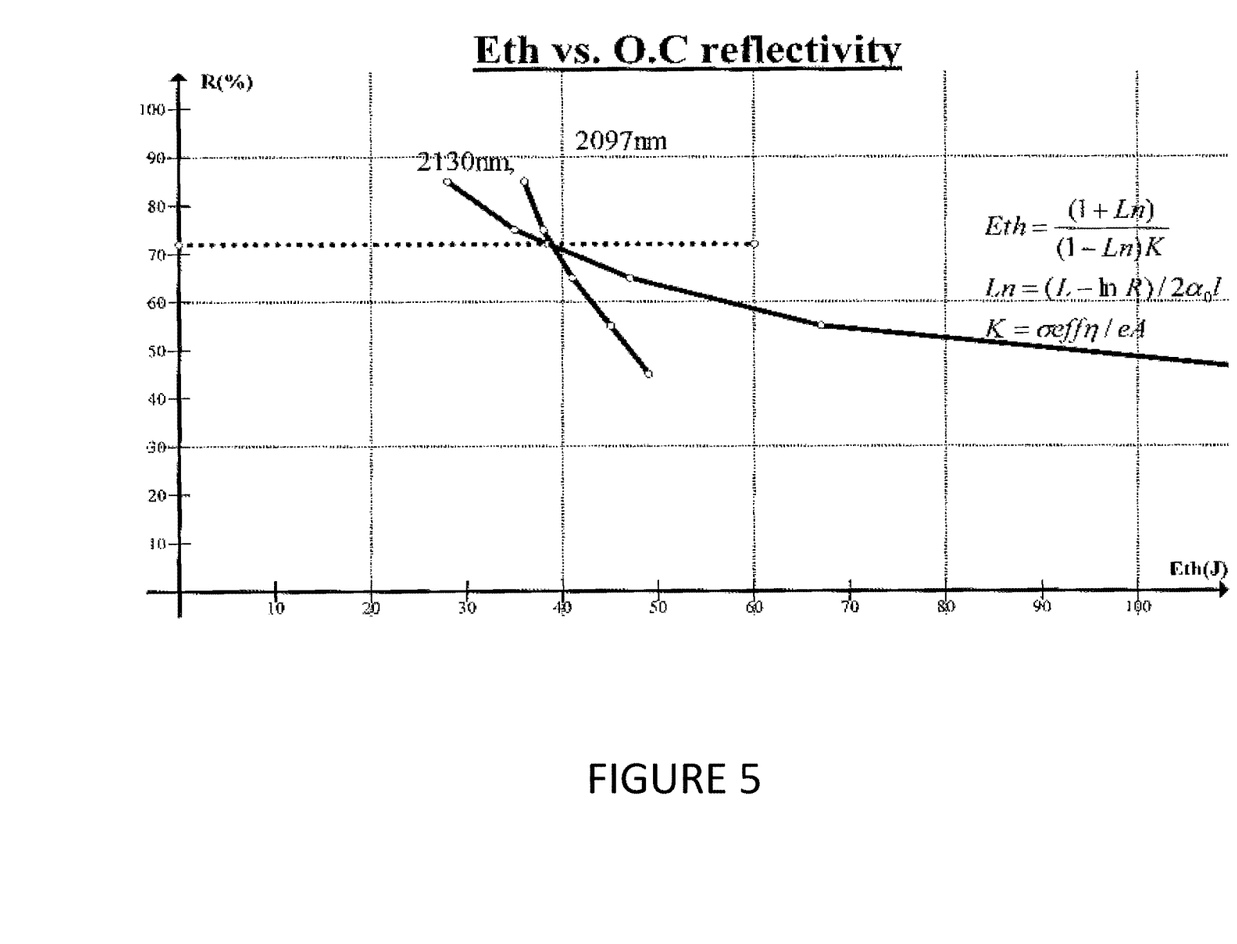
FIG. 5 is a graph showing the calculated threshold energies (Eth) for both transitions as a function of output coupler reflectivity (R).

FIG. 5 is a graphical representation of a plot showing the calculated threshold energies (Eth) for both transitions as a function of output coupler reflectivity (R) having the form of EQN 3 and EQN 4, whereby $\alpha_0$ is the absorption coefficient (@2130 nm=0.05/cm, @2097 nm=0.15/cm), K is the amplification coefficient (@2130 nm=0.057, @2097 nm=0.037), L is the passive resonator losses (0.03), l is the effective rod length (114 mm).

$$Eth = \frac{(1+Ln)}{(1-Ln)K} \quad \text{EQN 2}$$

$$Ln = (L - \ln R)/2\alpha_0 l \quad \text{EQN 3}$$

Referring to FIG. 5, since the 2097 nm transition has more ground state absorption, it behaves more like a pure 3-level system and the laser output it is less sensitive to variations of the output coupler reflectivity compared to the 2130 nm transition. Therefore, at 2097 nm a much lower output coupler 5 reflectivity can be used to produce a laser that is more reliable and substantially less prone to optical damage.

Considering mirror reflectivity tolerances and other factors, in order to achieve safe and repeatable 2097 nm operation, it is necessary to keep a safety margin of separation of minimum 5 Joules between calculated thresholds at 2130 and 2097 nm. For example if the calculated overlapping of the thresholds for 2097 and 2130 nm is 40 Joules, The output coupler should be selected witch such reflectivity to ensure a calculated threshold of at least 45 joules at 2130 nm.

Figure 6:
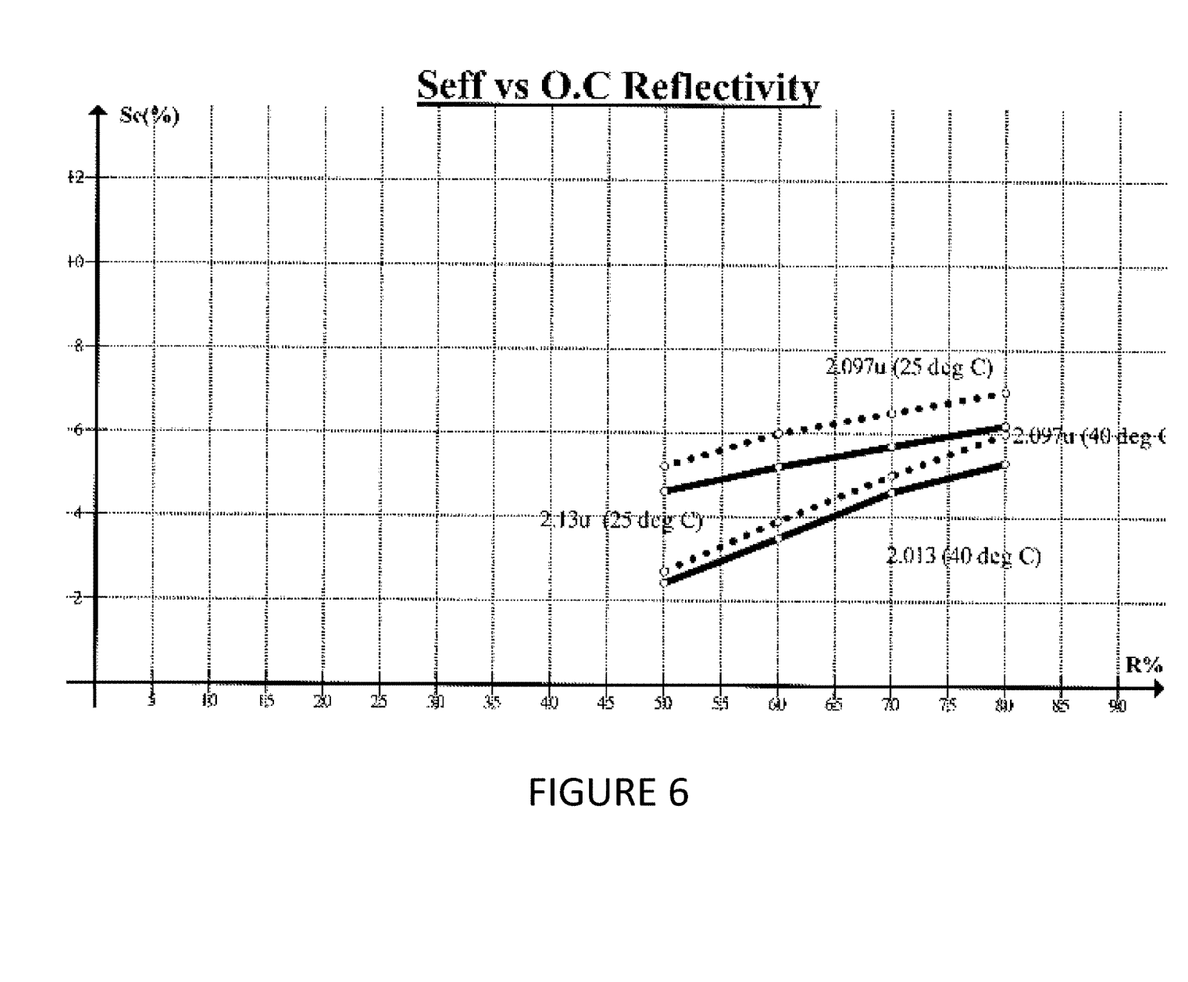
FIG. 6 a graph showing the calculated slope efficiency (Seff) as a function of output coupler mirror reflectivity (R).

FIG. 6 a graphical representation of a plot showing the calculated slope efficiency (Seff) as a function of output coupler mirror reflectivity (R) having the form of EQN 3 and EQN 4, whereby $\alpha_0$ is the absorption coefficient (@2130 nm=0.05/cm, @2097 nm=0.15/cm), K is the amplification coefficient (@2130 nm=0.057, @2097 nm=0.037), L is the passive resonator losses (0.02), l is the effective rod length (114 mm), and $\eta$ is the overall pumping efficiency (0.1).

$$Seff = \frac{(1-Ln)(1-R)}{(L-\ln R)}\eta \quad \text{EQN 4}$$

Referring to FIG. 6, same or better slope efficiency is achieved with 55% R at 2097 nm as with 80% reflectivity at 2130 nm. In this case for example the intra-cavity energy density at 2097 nm is lower by a factor of 2.6 therefore permitting failure proof laser operation and/or the possibility of more than doubling the output.

In order to validate the theoretical values derived from the equations above, an experiment was conducted where lasers were configured to lase at 2130 nm and 2097 nm were constructed as described earlier based on the theoretical equations described previously. The common components used to construction the lasers were as follows: 1) the laser cavity was a Marysol Technologies, diffusive type, model 1610-4-5; 2) the laser rod was a CTH:YAG Northrop Grumman, standard dopant concentrations, 4 mm diameter, 5 in long with a 4.5 in effective pumped length, end configuration Concave/Concave; 3) the flash lamp was a Marysol Technologies model 4500×, 4 mm bore, 5 mm OD, 450 Torr Xenon; 4) the high reflector mirror was a Lambda Research ½" diameter×¼" thick, Fused Silica, 99.8% R at 2100 nm.

For the 2130 nm laser, an output coupler mirror lens 81.7% R/AR, ½" diameter×¼" tk. Fused Silica was utilized, and for the 2097 nm laser an output coupler mirror 55% R/AR ½" diameter×¼" tk. Fused Silica was utilized.

The mirrors and diffusive cavity were arranged on the mounting structure such that there was a 9 inch distance between the highly reflective mirror and the output coupler. The flash lamp was configured to pulse every 350 microseconds. The diffusive cavity was pumped with cooling water of 1.3 gal/min at 25 C.

Figure 7:
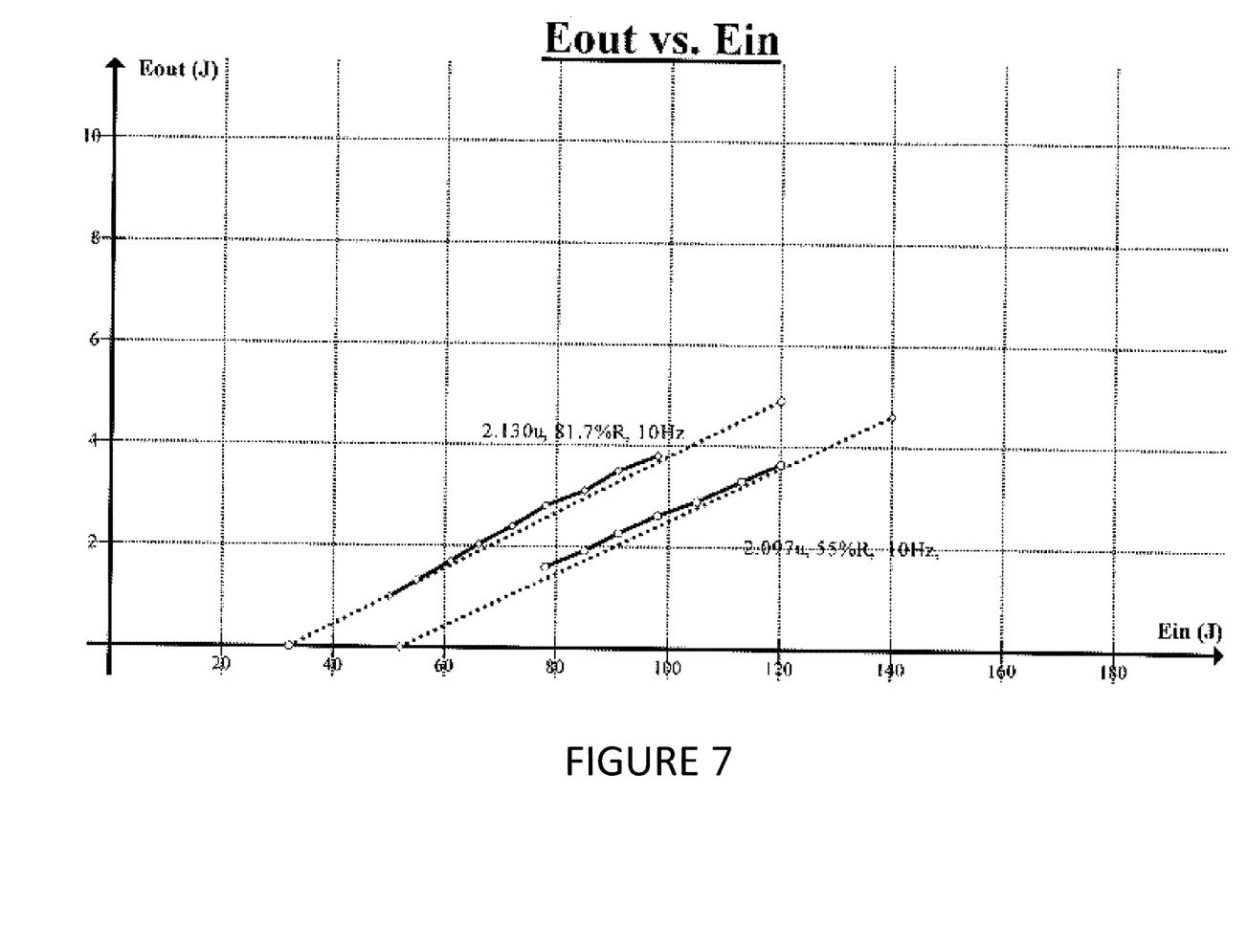
FIG. 7 a graph comparing the results of an actual experimental results for 83% R (2130 nm) and 55% R (2097 nm) output couplers with the theoretical calculated values derived with mathematical equations.

FIG. 7 is a graphical representation of the actual results of the experiment for both the 2130 nm laser and the 2097 nm laser with the calculated theoretical values. As is depicted in the figure the experimental results match very well theoretical calculations, validating the model which can be applied to different configurations involving different set of parameters such as pumping efficiency, rod size, passive losses, operating temperature affecting absorption value, effective cross sections, etc.

What is claimed is:

1. A method for operating a flash lamp pumped CTH:YAG laser resonator with un-pumped ends at 2097 nm comprising:
    minimalizing passive losses in the laser by means of minimalizing the length of the unpumped ends of the laser rod; said means comprising attaching metal connectors to the unpumped ends of the laser rod or using bonded laser rods in which a stub of undoped YAG is fused to the doped core material;
    selecting an output coupler with a reflectivity comprising 45-65% R, where the selection of the reflectivity of the output coupler to be utilized for the laser involves:
    mathematically modeling the laser operating at wavelengths of 2130 nm and 2097 nm;
    determining the point where the threshold energies (Eth) for each of these wavelengths overlap;
    adding a minimum amount of joules to the threshold energy where the wavelengths overlap to achieve safe and repeatable 2097 nm operation;
    mathematically calculating the reflectivity of the output coupler at said threshold energy where the wavelengths overlap with said minimum amount of joules added;
    whereby the resulting laser operates with lower intra-cavity energy density and increased output energy, decreasing the probability of optical breakdown of the laser components when operated.

* * * * *